(12) United States Patent
Dunlop

(10) Patent No.: US 8,487,169 B2
(45) Date of Patent: Jul. 16, 2013

(54) ADJUSTABLE ITEM HOLDER

(76) Inventor: Jim Dunlop, Benicia, CA (US)

( * ) Notice: Subject to any disclaimer, the term of this patent is extended or adjusted under 35 U.S.C. 154(b) by 13 days.

(21) Appl. No.: 13/231,875

(22) Filed: Sep. 13, 2011

(65) Prior Publication Data

US 2012/0266735 A1 Oct. 25, 2012

Related U.S. Application Data

(63) Continuation-in-part of application No. 13/091,065, filed on Apr. 20, 2011.

(51) Int. Cl.
G10D 3/00 (2006.01)

(52) U.S. Cl.
USPC ............................................ 84/329; 248/443

(58) Field of Classification Search
None
See application file for complete search history.

(56) References Cited

U.S. PATENT DOCUMENTS

| | | | | | |
|---|---|---|---|---|---|
| 487,820 | A | * | 12/1892 | Benson | 248/443 |
| 840,241 | A | * | 1/1907 | Nootbaar | 248/515 |
| 1,455,441 | A | * | 5/1923 | La Hodny | 248/484 |
| 2,546,757 | A | * | 3/1951 | Krarup | 248/443 |
| 2,650,788 | A | * | 9/1953 | Hulstein | 248/231.71 |
| 3,168,276 | A | * | 2/1965 | Schneider | 248/467 |
| 3,290,816 | A | * | 12/1966 | Eklof | 43/21.2 |
| 3,424,419 | A | * | 1/1969 | Siegel | 248/231.71 |
| 3,665,490 | A | * | 5/1972 | Oskar | 381/366 |
| 3,948,476 | A | * | 4/1976 | Kuniyosi | 248/443 |
| 4,754,945 | A | * | 7/1988 | Diamond | 248/460 |
| 5,684,258 | A | * | 11/1997 | Liao | 84/421 |
| 5,845,885 | A | * | 12/1998 | Carnevali | 248/181.1 |
| 6,536,720 | B1 | * | 3/2003 | Yu | 248/125.7 |
| 6,561,476 | B2 | * | 5/2003 | Carnevali | 248/288.31 |
| 6,815,598 | B1 | * | 11/2004 | Liao | 84/327 |
| 7,135,634 | B2 | * | 11/2006 | Chen | 84/453 |
| 7,265,282 | B2 | * | 9/2007 | Membreno et al. | 84/453 |
| 7,390,950 | B2 | * | 6/2008 | Hollander | 84/453 |
| 7,531,732 | B2 | * | 5/2009 | Dunlop | 84/329 |
| 7,669,816 | B2 | * | 3/2010 | Crain et al. | 248/183.3 |
| 7,723,595 | B2 | * | 5/2010 | Dunlop | 84/421 |
| 7,891,618 | B2 | * | 2/2011 | Carnevali | 248/228.6 |
| 8,141,839 | B2 | * | 3/2012 | Buchner | 248/516 |
| D661,342 | S | * | 6/2012 | Ridinger | D17/99 |
| 2004/0188576 | A1 | * | 9/2004 | Carnevali | 248/206.5 |
| 2006/0011795 | A1 | * | 1/2006 | Dobbins | 248/276.1 |
| 2006/0175766 | A1 | * | 8/2006 | Carnevali | 277/628 |
| 2008/0061197 | A1 | * | 3/2008 | Carnevali | 248/181.1 |
| 2008/0092717 | A1 | * | 4/2008 | Dunlop | 84/329 |
| 2008/0190265 | A1 | * | 8/2008 | Dunlop | 84/421 |
| 2008/0296454 | A1 | * | 12/2008 | Carnevali | 248/231.71 |
| 2009/0000457 | A1 | * | 1/2009 | Dunlop | 84/329 |
| 2011/0283863 | A1 | * | 11/2011 | Dunlop | 84/329 |
| 2012/0266735 | A1 | * | 10/2012 | Dunlop | 84/329 |

* cited by examiner

Primary Examiner — David Warren
Assistant Examiner — Robert W Horn
(74) Attorney, Agent, or Firm — West & Associates, A PC; Stuart J. West; Shaun N. Sluman

(57) ABSTRACT

A holder, comprising a retaining device adapted to selectively couple with an item and a base adapted to selectively couple with a surface, and a clamp assembly coupled with the retaining device and base. The clamp assembly allows relative adjustment of the retaining device and base members.

9 Claims, 13 Drawing Sheets

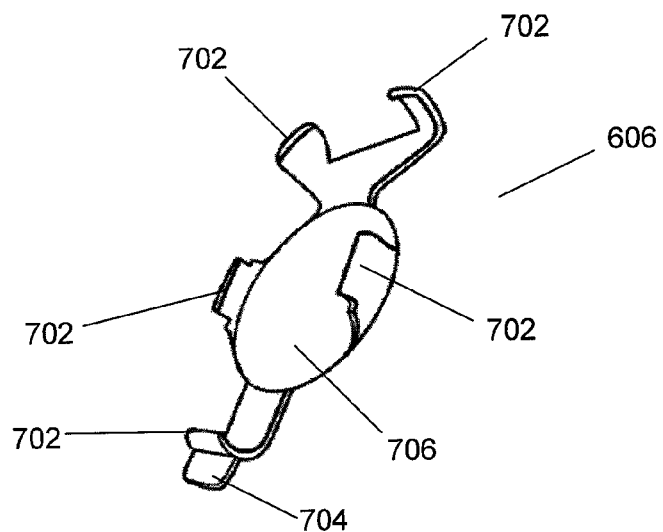
FIG. 7a
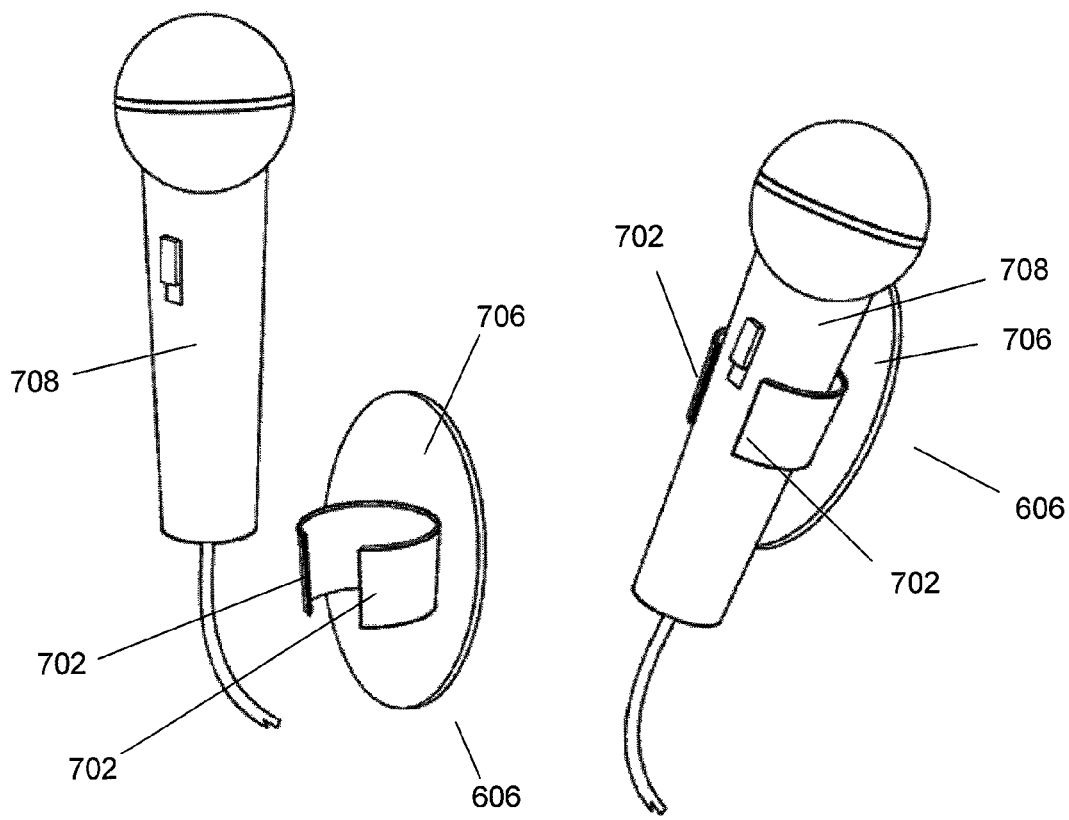
FIG. 7b
FIG. 7c

ADJUSTABLE ITEM HOLDER

CLAIM OF PRIORITY

The present application is a continuation-in-part of and claims priority to U.S. patent application Ser. No. 13/091,065, filed on Apr. 20, 2011, the complete contents of which are hereby incorporated by reference.

BACKGROUND

1. Field of the Invention

The present device relates generally to the field of accessories for holding miscellaneous items, and particularly to devices for holding items while playing a musical instrument.

2. Background

People frequently find it difficult to position items such as tablet computers or sheet music in a desired configuration for ease of use and proper viewing angle. Additionally, it is sometimes desirable to lift an item off of a table, desk, or other surface to protect it from spills or soiled surfaces. Trying to prop up these or other items against books, walls, or other surfaces can prove inefficient and cumbersome.

Musicians often need to position sheet music or other notes for easy reading while playing. However, sheet music stands or other accessories that are currently on the market are often too bulky and do not offer compact adjustability. Further, a musician may desire mobility while playing and require sheet music portability.

Thus, what is needed is an adjustable item holder adapted to engage a desired item and keep it stabilized in a desired geometric configuration relative to the user. For example, musicians need an embodiment designed to hold sheet music or media devices in close proximity to themselves or directly attached to an instrument.

BRIEF DESCRIPTION OF THE DRAWINGS

FIGS. 7*a*-7*c* depict an alternate embodiment of the attachment device depicted in FIGS. 5 and 6.

DETAILED DESCRIPTION

Figure 1:
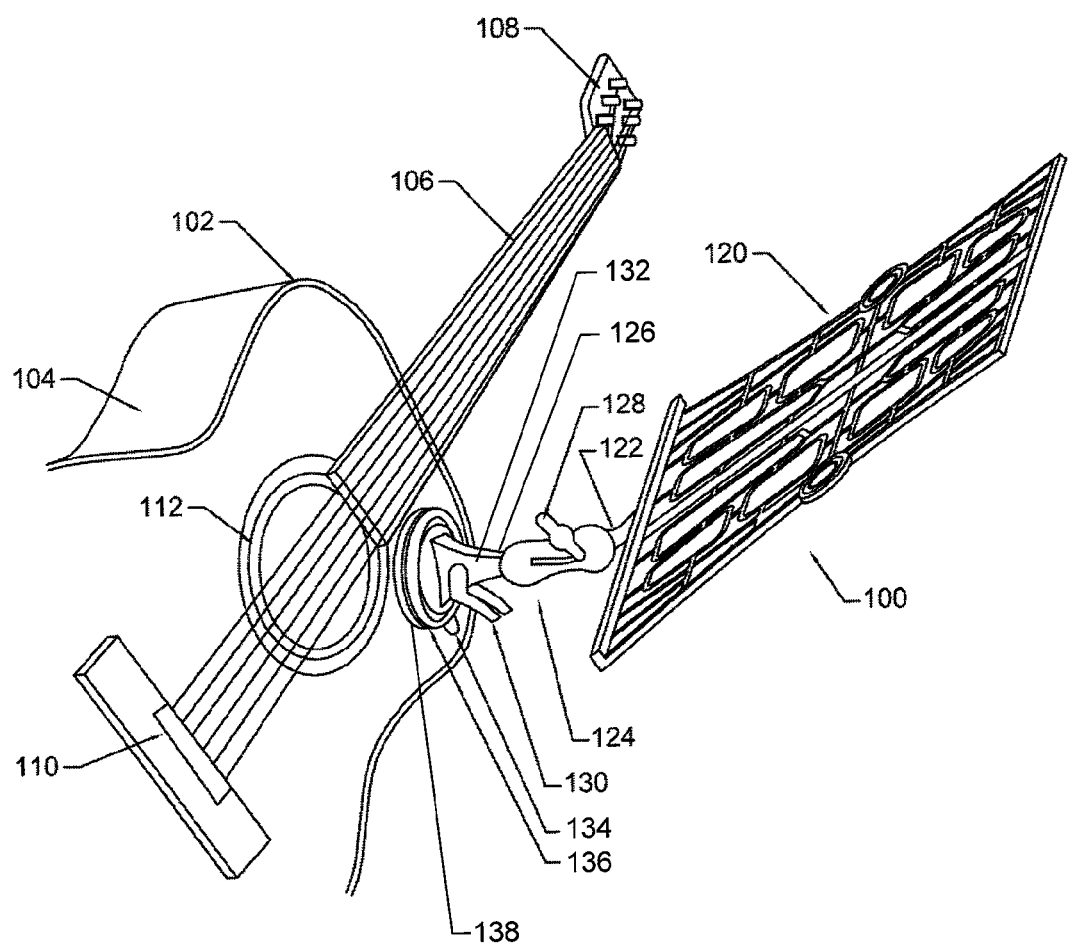
FIG. 1 depicts a perspective view of a sheet music holder embodiment of the present device attached, as an example, to an acoustic guitar.

FIG. 1 depicts a sheet music holder embodiment of the present device, and is referred to herein by the general reference numeral 100. A sheet music holder 100 can attach, for example, to an acoustic guitar 102 comprising a body 104, a fret board 106, a key head 108, a bridge 110, and a sounding hole 112. While FIG. 1 depicts use of a sheet music holder 100 being used in connection with an acoustic guitar 102, in alternate embodiments, a sheet music holder 100 can be used in connection with any item, instrumental or otherwise.

In the embodiment shown in FIG. 1, a sheet music holder 100 can comprise a sheet holding tray 120 with a tray clamp ball 122 joined by a clamp assembly 124 to a base clamp ball 126 and tightened with a handle 128. In the embodiment shown in FIG. 1, a power-assisted suction base can be comprised of an activation lever 130 inside a base housing 132 that can draw the base securely onto a guitar 102. In some embodiments, a suction base can include a release tab 134 that allows a quick release of suction cup 136 from a non-porous or substantially non-porous surface.

In some embodiments, a substantially non-porous or a non-porous surfaced golpe board 138 can be used if the instrument itself has a porous surface. In the embodiment depicted in FIG. 1, a clamp assembly 124 can allow a user to position a sheet holding tray 120 in substantially any convenient position relative to the instrument and/or golpe board 138 and/or mounting surface. In operation, a tray clamp ball 122 and base clamp ball 126 can be loosely coupled with a clamp assembly 124, a sheet holding tray 120 can be positioned as desired, and then a clamp assembly 124 can be fully tightened to fix a geometric relation between a mounting surface and a sheet holding tray 120.

In some embodiments, a golpe board 138 can be attached to the body 104, e.g., with adhesive or via any other known and/or convenient apparatus, mechanism or compound, and can provide a high-quality, non-porous or substantially non-porous surface for vacuum cup attachment. Traditionally, golpe boards are attached to guitars for flamenco music performances where the guitar body is subject to heavy tapping that could damage the soft wood and finishes. If a guitar body 104 already has a suitable surface, the golpe board 138 may not be needed and can be omitted. In alternate embodiments, a golpe board 138 can be comprised of any known and/or convenient material and can have any known and/or convenient shape and can be attached in any known and/or convenient manner to a guitar body. In still further alternate embodiments, a golpe board 138 may not be a traditional golpe board, but can be comprised of any known and/or convenient material and can have any known and/or convenient shape and can be attached to any convenient manner to any surface of any item, instrument and/or object.

In some embodiments, a suction base and clamp assembly can be a National Products, Inc., type RAM-B-101-2241U, RAM-MOUNT with twist lock cup. The twist lock power-assisted suction device is described by Jeffrey Carnevali in U.S. Pat. No. 6,666,420, issued Dec. 23, 2003, the complete contents of which is incorporated herein by reference. However, in alternate embodiments, any known and/or convenient non-power-assisted and/or power-assisted suction mechanism can be used.

Figure 2:
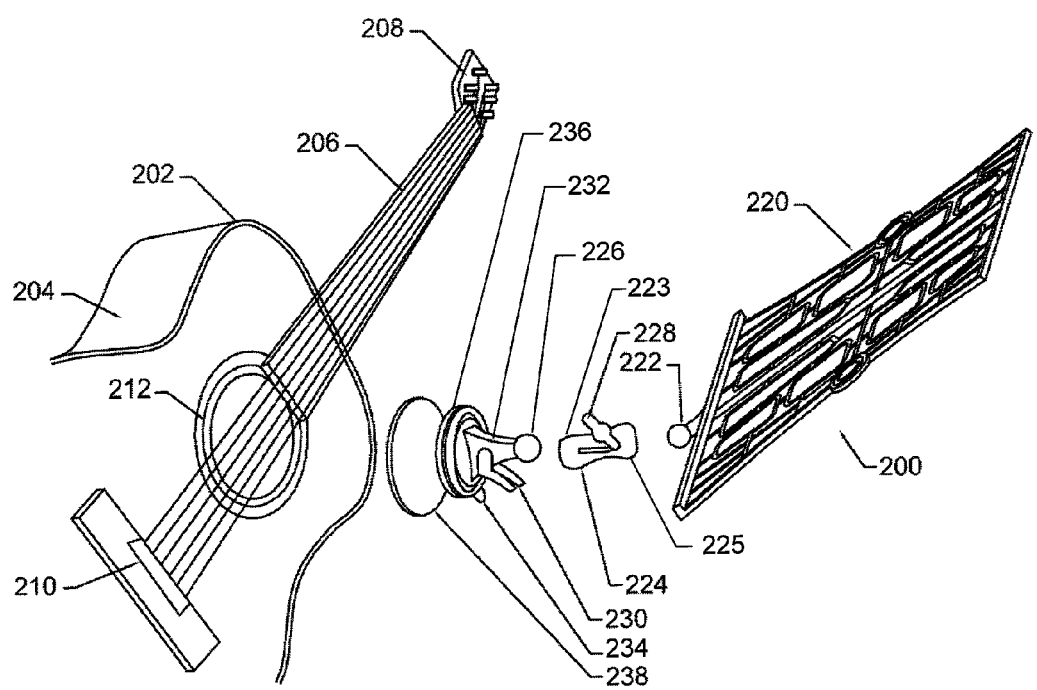
FIG. 2 depicts a perspective view of an exploded assembly diagram of a sheet music holder embodiment of FIG. 1 showing how the pieces can come together and attach to an acoustic guitar.

FIG. 2 depicts a sheet music holder assembly, and is referred to herein by the general reference numeral 200. The sheet music holder 200 can attach to a musical instrument or nearby surface. If the musical instrument or nearby surface is an acoustic guitar 202, such can comprise a body 204, a fret board 206, a key head 208, a bridge 210, and a sounding hole 212. In some embodiments, the sheet music holder 200 can comprise a sheet holding tray 220 coupled with a tray clamp ball 222, a clamp assembly 224, and a suction base. In the embodiment shown in FIG. 2, a clamp assembly 224 can comprise a pair of clamp shells 223 and 225 which define ball sockets capable of selectively engaging the tray clamp ball 222 and a similar base clamp ball 226 at each end. In some embodiments, a pair of clamp shells 223 225 can be simultaneously tightened around both clamp balls 222 and 226 with a single T-handle tightening nut 228 on a bolt and/or via any other known and/or convenient mechanism. In alternate embodiments, each end of the clamp shells 223 225 can be individually controlled to selectively engage each of the clamp balls 222 226 in any known, convenient and/or desired manner. In some embodiments, at least a portion of the interior surface of at least one of the clamp shells 223 225 can include an elastomeric surface having a desired coefficient of kinetic and/or static friction relative to one or more of the clamp balls 222 226. In alternate embodiments, at least a portion of the exterior surface of one or more of the clamp balls 222 226 can include an elastomeric surface having a desired coefficient of kinetic and/or static friction relative to at least one of the interior surfaces of the at least one portion of one of the clamp shells 223 225.

In the embodiment depicted in FIG. 2, the suction base can have an activation lever 230 operably coupled with a base housing 232 that draws the base tight onto a non-porous and/or substantially non-porous surface. In some embodiments, a release tab 234 allows a quick release of suction cup 236, e.g., against a golpe board 238 that was coupled with the guitar body 204. The clamp assembly 224 can allow a user to position a sheet holding tray 220 relative to the instrument or nearby surface in any known and/or convenient geometric relation.

Figure 3:
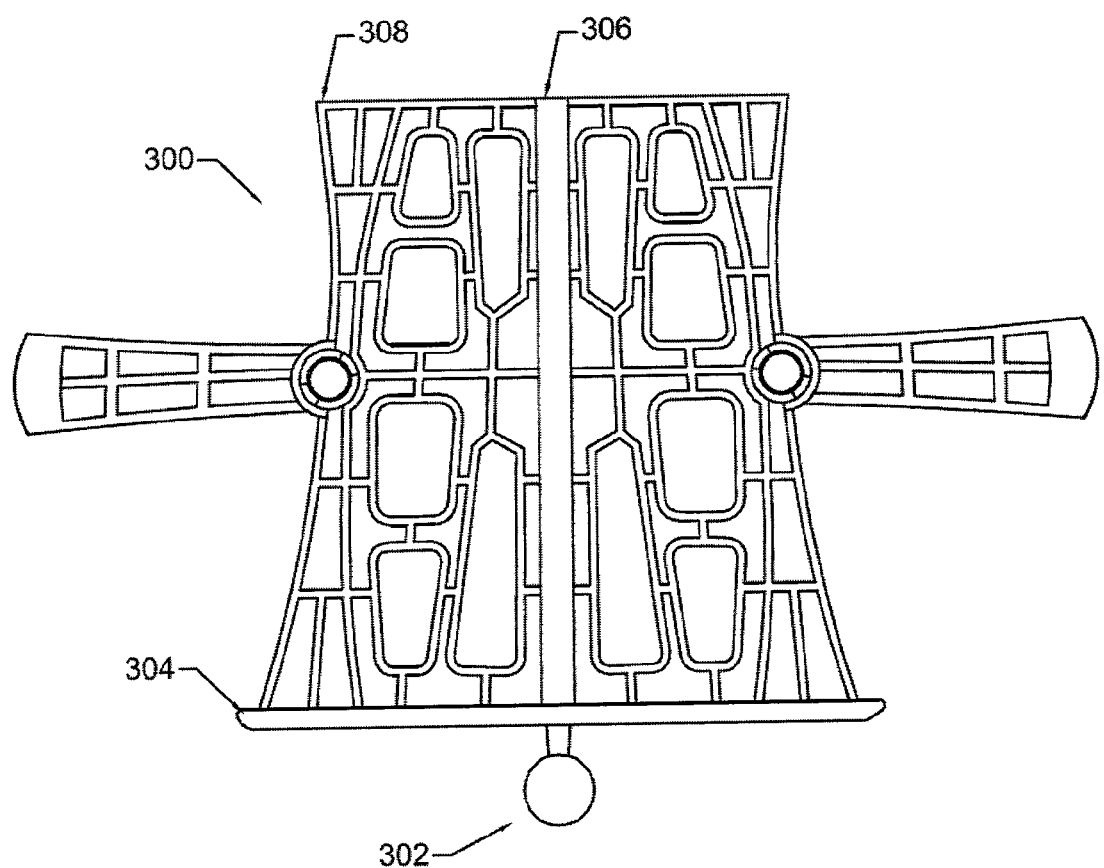
FIG. 3 depicts a perspective view of a decorative type of sheet music tray that can be included in the holders illustrated in FIGS. 1 and 2.

FIG. 3 shows a music sheet tray 300 with an embodiment of a decorative design that can provide maximum surface area and strength with a minimum of weight. However, in other embodiments, any other known and/or convenient design can be used. A tray 300 can comprise a tray clamp ball 302 to selectively engage with a clamp assembly 124 224 as shown in FIGS. 1 and 2, respectively. A lip 304 can provide a bottom support for sheets of paper, such as, but not limited to sheet music, performance notes, and set lists. In some embodiments, a tray clamp ball 302 and base clamp ball 226 can have substantially equivalent diameters, but in other embodiments can have relative diameters in any other known and/or convenient ratio. A back 308 can be visible to an audience, and a backbone 306 can provide added strength, such as could be needed in a plastic injection molded implementation.

Figure 4A:
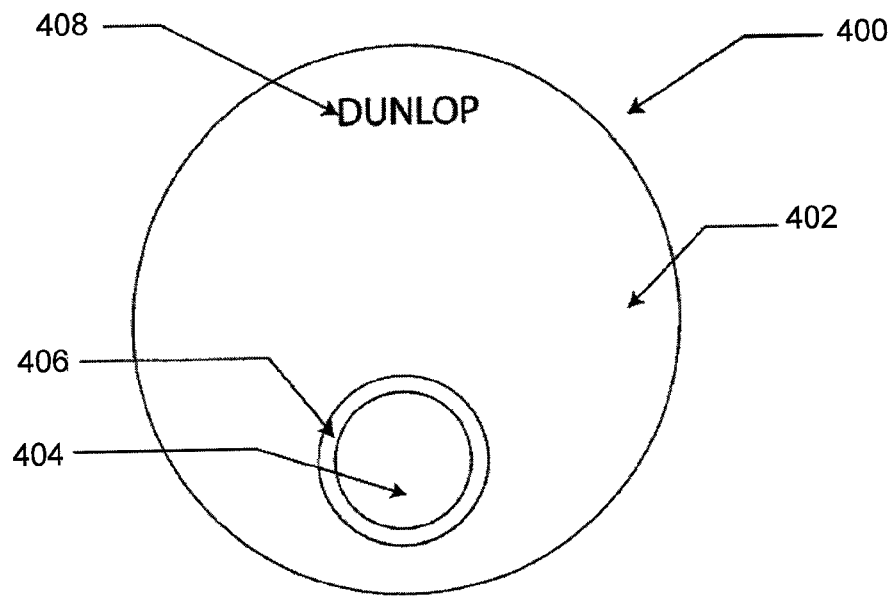
FIG. 4*a* depicts a plan view of a mounting board that can be selectively coupled with a sheet music tray via a suction mechanism.

FIG. 4a depicts a mounting board 400 that can be used in conjunction with a sheet music holder 100. In the embodiment shown in FIG. 4a, a mounting board 400 can be comprised of a first region 402 and a second region 404 and a transition region 406. In the embodiment shown in FIG. 4a, a first region 402 can have any known and/or convenient texture and/or porosity and/or image and/or geometric properties. In some embodiments, the first region can be substantially planar and can be comprised of a substantially non-porous material. However, in alternate embodiments, the first region can have a non-uniform surface. In still further alternate embodiments, the first region 402 can include any convenient decoration and/or image 408.

In the embodiment shown in FIG. 4a, a second region 404 can be substantially planar and can be comprised of a substantially non-porous material and/or any material capable of substantially maintaining a vacuum bond with the suction cup of the sheet music holder 100. In some embodiments, a first region 402 and a second region 404 can be comprised of the same and/or similar material and can be of unitary construction. However, in alternate embodiments, the first region 402 and the second region 404 can be comprised of different materials and can be coupled with each other.

In the embodiment shown in FIG. 4a, a mounting board 400 can include a transition region 406. In the embodiment shown in FIG. 4a, a transition region 406 can serve to, at least partially, separate a first region 402 and a second region 404. In some embodiments, a first region 402, a second region 404, and a transition region 406 can be comprised of the same material and can be of unitary construction. In alternate embodiments, a transition region 406 can be comprised of any known and/or convenient material and/or can be comprised of the same material as a first region 402 and/or a second region 404. In some embodiments, a transition region 406 can bear any known and or convenient geometric relation to a first region 402 and a second region 404.

In some embodiments, the underside 410 of a mounting board 400 can have any known and/or convenient geometry properties. In some embodiments, the underside 410 of a mounting board 400 can include a temporary bonding material such that the underside 410 of a mounting board 400 can be selectively coupled with any known and/or convenient surface and/or material. In some embodiments, the underside 410 of a mounting board 400 can include a surface that has a substantially high coefficient of static and/or kinetic friction relative to any selected material.

Figure 4B:
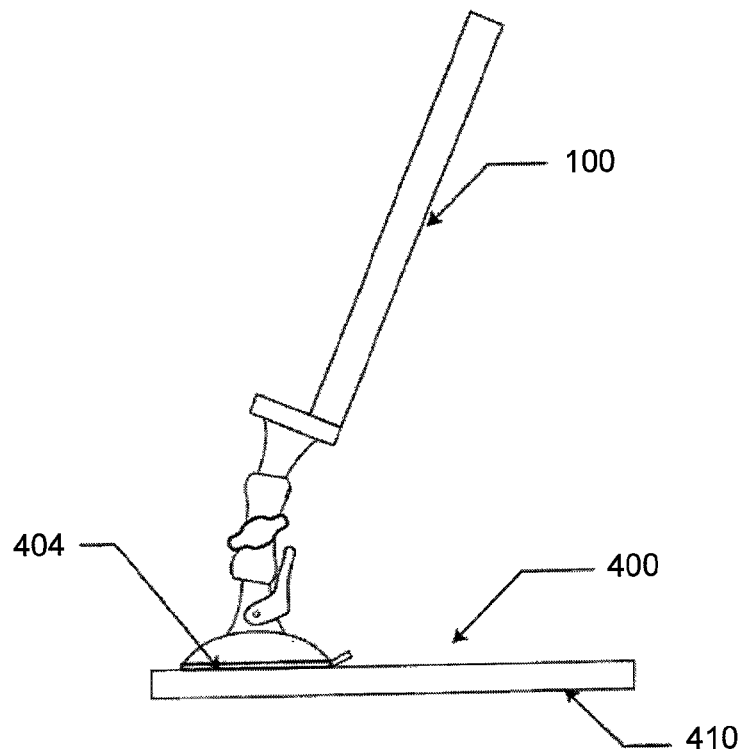
FIG. 4*b* depicts an elevation view of a sheet music tray coupled with the mounting board via a suction mechanism.

FIG. 4b depicts an embodiment of a mounting board 400 depicted in FIG. 4a in use with a sheet music holder 100. In the embodiment shown in FIG. 4b, a mounting board 400 can be substantially planar and a sheet music holder 100 can be selectively coupled with a second region 404 of a mounting board 400 via a suction base. In some embodiments, a mounting board 400 can have any known and/or convenient geometric and/or inertial and/or section modulus properties such that when a mounting board 400 and a sheet music holder 100 are coupled, the combination can statically and/or dynamically stable.

In some embodiments, in operation, a sheet music holder 100 can be used with or without a mounting board 400 and can, in some embodiments, be used by a computer operator or typist to support paper, documents, books and/or other items.

In some embodiments, in operation, a sheet music holder 100 can be used with or without a mounting board 400 and can, in some embodiments, be used by a chef and/or any other person to support recipes, paper, documents, books and/or other items.

In some embodiments, in operation, a sheet music holder 100 can be used with or without a mounting board 400 and can be supported on any convenient surface, such as, but not limited to, over a table cloth, on a couch, on a floor and/or any other surface capable of supporting the base and/or capable of being attached by the suction mechanism.

In some embodiments, a sheet music holder 100 can be removably mounted, via a suction mechanism, directly on an instrument, such as, but not limited to, a guitar, bass, ukulele, keyboard and/or any other instrument having a non-porous and/or substantially non-porous surface. In alternate embodiments, a sheet music holder 100 can be removably mounted, via a suction mechanism, directly on an instrument, such as, but not limited to, a guitar, bass, ukulele, keyboard and/or any other instrument which has been coupled and/or removably coupled with a non-porous and/or substantially non-porous surface.

Figure 5:
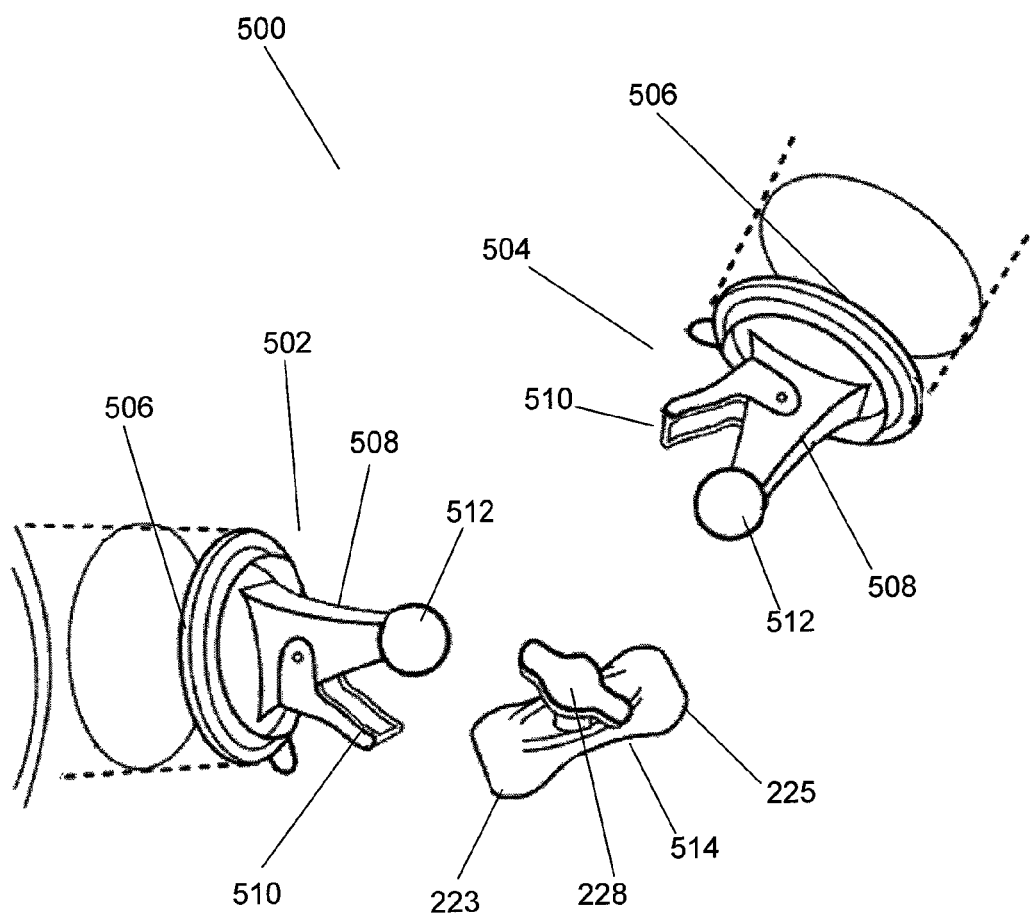
FIG. 5 depicts an alternate embodiment of the apparatus depicted in FIG. 1.

FIG. 5 depicts an alternate embodiment of a sheet holder 100 depicted in FIGS. 1-4. In the embodiment depicted in FIG. 5, an apparatus 500 can be comprised of a first power-assisted suction device 502 coupled with a second power-assisted suction device 504. Each of the power-assisted suction devices 502 504 can be comprised of a suction membrane 506, a housing 508, an actuator 510, and a coupling 512. A suction membrane 506 can be coupled with a housing 508 and can be operationally coupled with an actuator 510. In the embodiment depicted in FIG. 5, a coupling 512 can be a spherical ball coupled with the housing, but in other embodiments can be any other known and/or coupling device.

In operation, when an actuator 510 is transitioned from a first position to a second position, negative pressure can be applied to the side of a suction membrane 506 proximal to a housing 508 causing the opposite side of a suction membrane 506 to create a vacuum and thus be attracted to a desired surface. In the embodiment depicted in FIG. 5, the suction membrane 506 of the first power-assisted suction device 502 can be positioned and/or geometrically oriented relative to the suction membrane 506 of a second power-assisted suction device 504 in any desired position, configuration and/or geometric orientation.

In the embodiment depicted in FIG. 5, an apparatus 500 can comprise a configurable couple 514. In some embodiments the configurable couple 514 can be comprised of a pair of clamp shells 223 and 225 which define ball sockets capable of selectively engaging a coupling 512 at each end. In some embodiments, a pair of clamp shells 223 225 can simultaneously frictionally engage both couplings 512 via any known and/or convenient mechanism. In alternate embodiments, each end of clamp shells 223 225 can be individually controlled to selectively engage each of couplings 512 in any known, convenient and/or desired manner. In some embodiments, at least a portion of the interior surface of at least one of clamp shells 223 225 can include an elastomeric surface having a desired coefficient of kinetic and/or static friction relative to one or more of the couplings 512. In alternate embodiments, at least a portion of the exterior surface of one or more of couplings can include an elastomeric surface having a desired coefficient of kinetic and/or static friction relative to at least one of the interior surfaces of the at least one portion of one of clamp shells 223 225.

Figure 6:
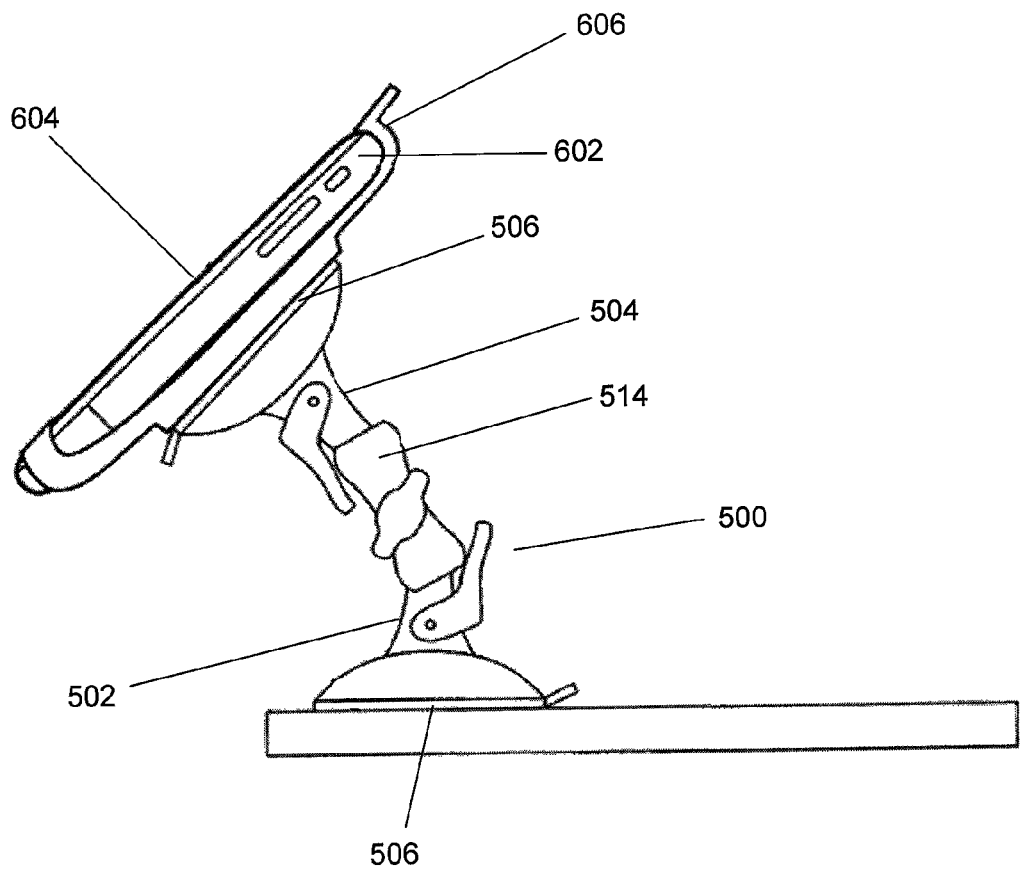
FIG. 6 depicts an embodiment of the apparatus of FIG. 5 in use.

FIG. 6 depicts an embodiment of an apparatus 500 depicted in FIG. 5, in use. In the embodiment depicted in FIG. 6, the suction membrane 506 of a first power-assisted suction device 502 of apparatus 500 depicted in FIG. 5 can be coupled with a guitar. In alternate embodiments, a suction membrane 506 can be coupled with any desired surface. In the embodiment depicted in FIG. 6, a suction membrane 506 of a second power-assisted suction device 504 of an apparatus 500 can be coupled with a device 602 including a display 604. In operation, first and second power-assisted suction devices 502 504 and configurable couple 514 can be configured and semi-permanently fixed in a desired configuration such that a user can easily view a display 604 at a desired angle. In some embodiments, a device 602 can be selectively coupled with a retaining device 606 adapted to selectively engage and retain a device 602.

FIGS. 7a-7c depict alternate embodiments of a retaining device 606. In the embodiment depicted in FIG. 7a, a retaining device 606 can includes a plurality of prongs 702 adapted to engage with a desired device. In some embodiments, at least one of the prongs 702 can include a prying mechanism 704 such that a retaining device 606 can be deformed to facilitate the insertion and/or removal of an item. In some embodiments a retaining device 606 can include a suction panel 706. A suction panel 706 can be adapted to selectively engage power-assisted suction devices 502 504. In some embodiments a suction panel 706 can be fabricated of the same material as a retaining device 606. However, in alternate embodiments it can be, at least in part, fabricated of a material designed to facilitate the vacuum attachment between power-assisted suction devices 502 504 and a retaining device 606.

FIGS. 7b and 7c depict alternate embodiments of a retaining device 606 depicted in FIG. 7a. In the embodiment depicted in FIGS. 7b and 7c, the prongs 702 can be configured to retain a microphone 708. However, in alternate embodiment the retained item can be any known and/or desired object and/or item.

Figure 8:
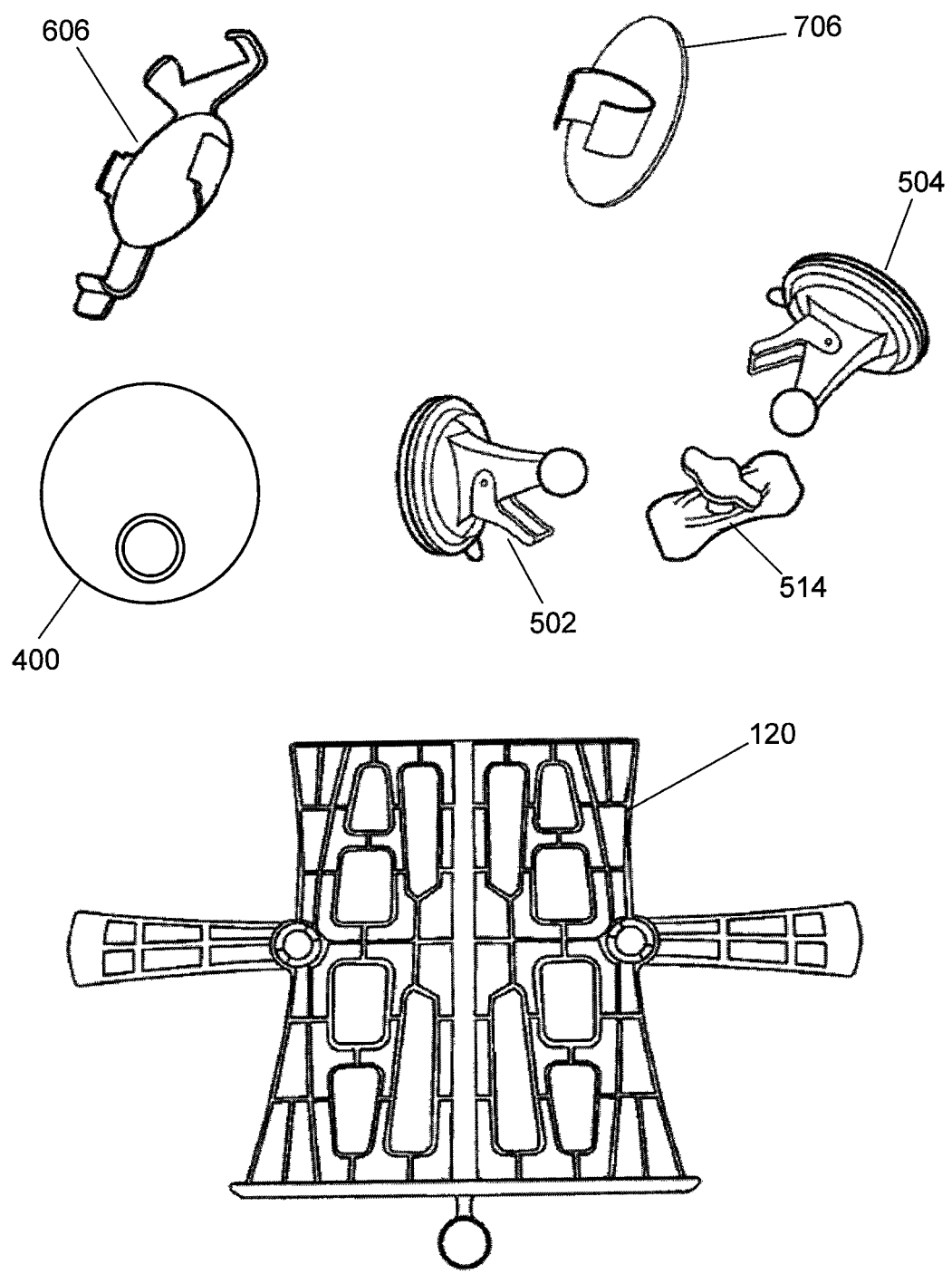
FIG. 8 depicts a kit comprising selected elements as depicted in FIGS. 1-7.

FIG. 8 depicts an embodiment of a kit comprising any desired number of components as outlined in this description. In some embodiments a kit can comprise a sheet holding tray 120, a mounting board 400, a first power-assisted suction device 502, a second power-assisted suction device 504, a configurable couple 514, a retaining device 606, and a suction panel 706. However, in alternate embodiments, a kit can comprise any quantity of any of the elements described in this disclosure.

Figure 9:
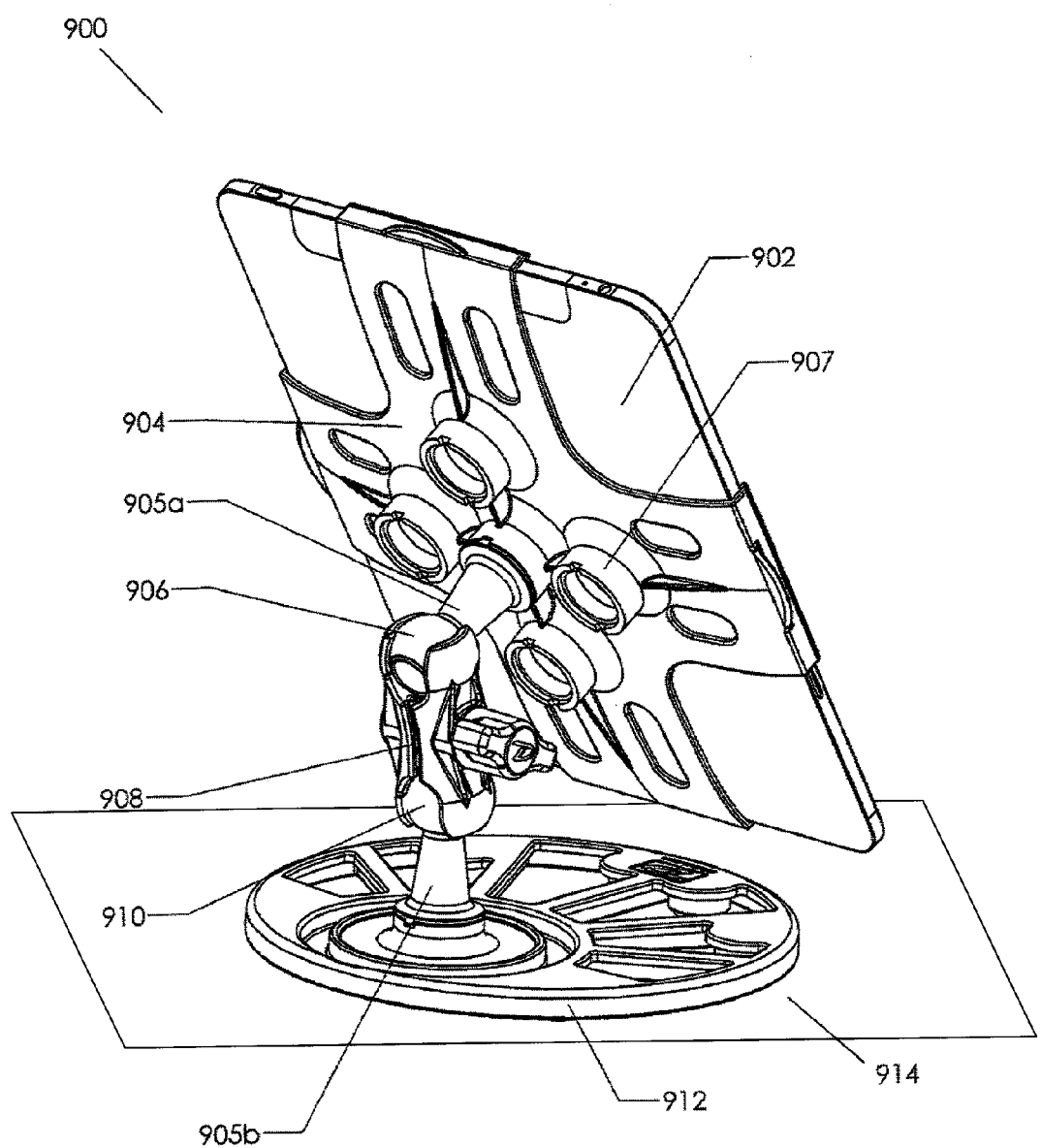
FIG. 9 depicts one embodiment of an adjustable item holder.

FIG. 9 represents another embodiment of an adjustable item holder 900 without suction mechanisms. An item holder 900 can comprise a retaining device 904 coupled with a tray clamp ball 906, a clamp assembly 908, and a base clamp ball 910 coupled with a base 912. In the embodiment depicted, a tray clamp ball 906 can be coupled with a retaining device 904 via a first protrusion 905a, and a base clamp ball 910 can be coupled with a base 912 via a second protrusion 905b. However, in other embodiments, clamp balls 906 910 can be coupled with a retaining device 904 and base 912, respectively, in any other known and/or convenient manner. Although FIG. 9 depicts use of an item holder 900 in connection with a tablet computer 902, in alternate embodiments a holder 900 can be used with any other desired item 902, such as but not limited to: paper, books, phones, computers, cameras, portable media players, or sheet music.

As shown in the embodiment in FIG. 9, a first protrusion 905a can selectively engage with one of a plurality of engagement regions 907. In the embodiment shown in FIG. 9, an engagement region 907 can have a geometry, such as, but not limited to substantially circular, to selectively engage with a first protrusion 905a. In some embodiments, a first protrusion 905a can be selectively engage with an engagement region 907 via a friction fit, snap fit, or any other known and/or convenient mechanism.

An item holder 900 can be used with any known and/or convenient surface 914, such as, but not limited to, a desk, a table, a musical instrument, a car dashboard, or the ground. A base 912 can enable an item holder 900 to remain in a desired position relative to a surface 914 during use. In some embodiments, a base 912 can be weighted such that when an electronic device or other desired item 902 is coupled with a retaining device 904, an item holder 900 can be stabilized. In other embodiments, a base 912 can comprise temporary bonding material for selectively coupling with another surface, and/or can have non-skid properties. In yet other embodiments, a base 912 can be adapted to couple with any surface 914 in any other known and/or convenient manner.

Moreover, a base 912 can have any known and/or convenient texture and/or porosity and/or image and/or geometric properties. In some embodiments, a base 912 can be substantially planar and can be comprised of a substantially non-porous material. However, in alternate embodiments, a base 912 can have a non-uniform surface. In still further alternate embodiments, a base 912 can include any convenient decoration and/or image.

Figure 10:
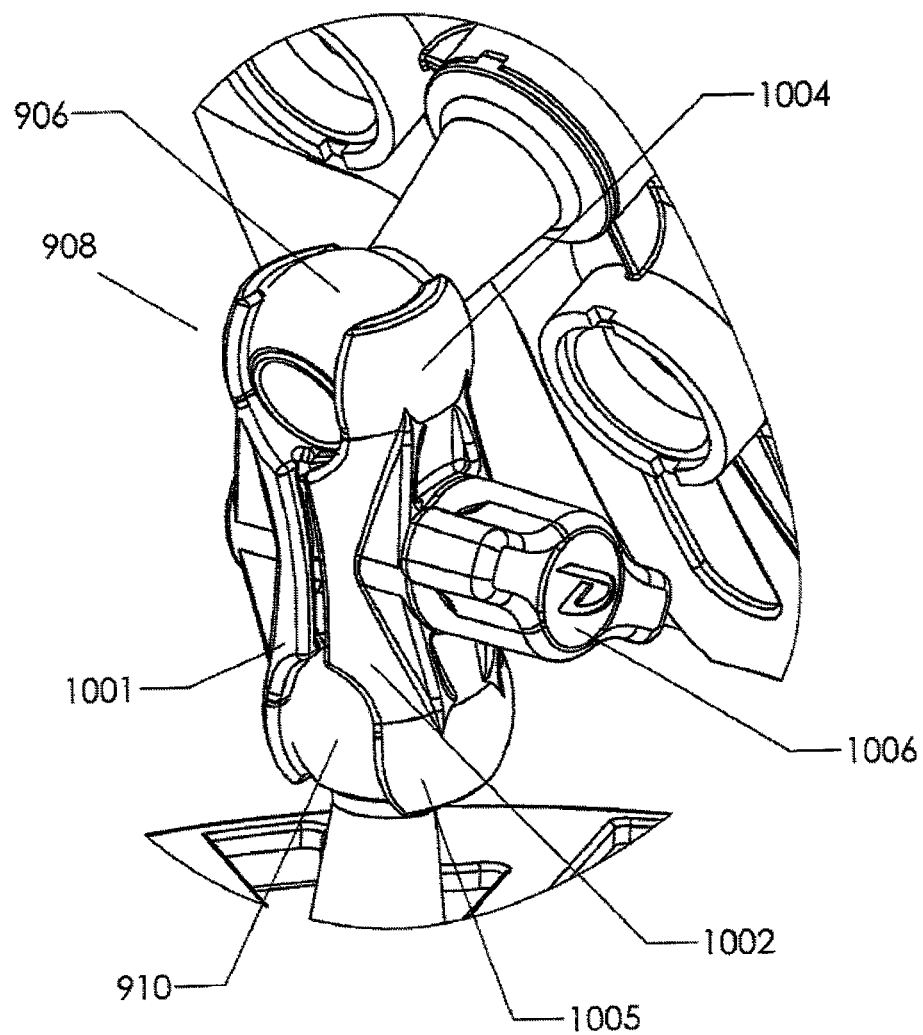
FIG. 10 depicts a close-up view of a clamp assembly.

As shown in FIG. 10, a clamp assembly 908 can be comprised of a pair of clamp shells 1001 and 1002 which define ball sockets 1004 1005 capable of selectively engaging ball couplings 906 910 at each end. In some embodiments, a pair of clamp shells 1001 1002 can simultaneously frictionally engage both ball couplings 906 910 via a T-handle tightening nut 1006 or any known and/or convenient mechanism. In alternate embodiments, each end of clamp shells 1001 1002 can be individually controlled to selectively engage each of ball couplings 906 910 in any known, convenient and/or desired manner. In some embodiments, at least a portion of the interior surface of at least one of the clamp shells 1001 1002 can include an elastomeric surface having a desired coefficient of kinetic and/or static friction relative to one or more of the ball couplings 906 910. In alternate embodiments, at least a portion of the exterior surface of one or more of the ball couplings 906 910 can include an elastomeric surface having a desired coefficient of kinetic and/or static friction relative to at least one of the interior surfaces of at least one portion of one of the clamp shells 1001 1002.

Figure 11:
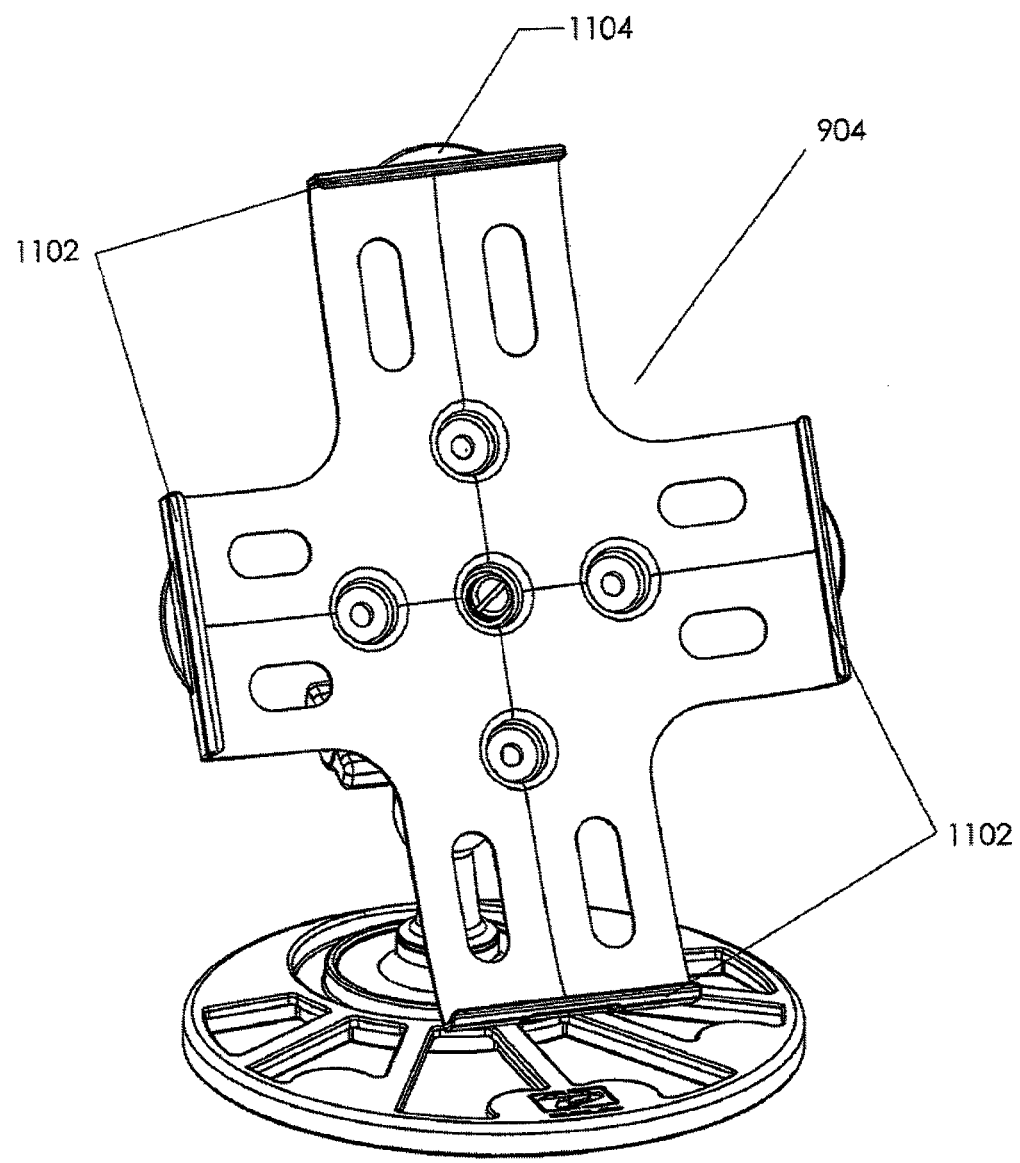
FIG. 11 depicts a front view of a retaining device.

FIG. 11 depicts an embodiment of an empty retaining device 904. In the embodiment depicted, a retaining device 904 can include a plurality of prongs 1102 adapted to engage a desired item 902. In some embodiments, at least one prong 1102 can include a prying mechanism 1104 such that the device 904 can be deformed to facilitate the insertion and/or removal of an item 902.

In some embodiments, a retaining device 904, a clamp ball 906 and/or 910, a clamp assembly 908 and/or a base 912 can be fabricated from metal, plastic, polymer, or any other known and/or convenient material or combination of materials. In some embodiments, these elements can be uniform in color or can be comprised of different colors and/or patterns. In yet other embodiments, an adjustable item holder 900 can have intrinsic anti-bacterial properties or can have protective anti-bacterial and/or ultraviolet-resistant coating. In alternate embodiments, the elements of an item holder 900 can have any other known and/or convenient surface or material properties.

Figure 12:
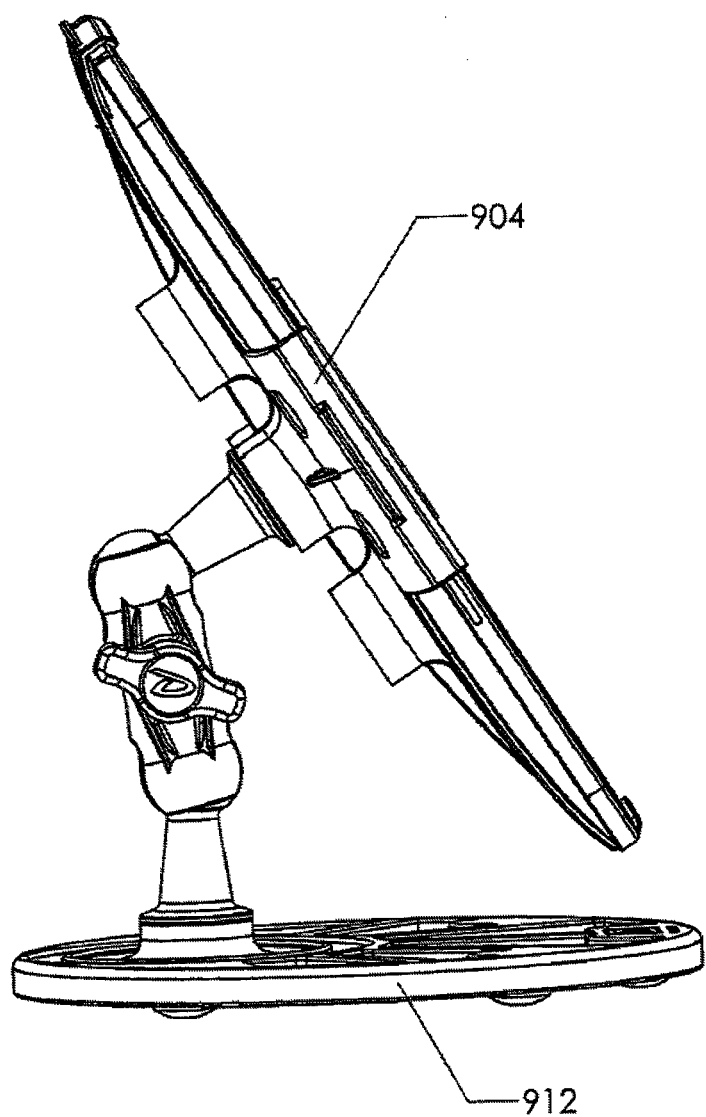
FIG. 12 depicts a side view of one embodiment of the present device.

In operation, a tray clamp ball 906 and base clamp ball 910 can be loosely coupled with a clamp assembly 908 such that a retaining device 904 can be positioned as desired, and a clamp assembly 908 can be fully tightened to fix a geometric relation between a base 912 and a retaining device 904. A first protrusion 905a can be selectively engaged with an engagement region 907 to further adjust the device to a desired position. An item 902 can then be coupled with a retaining device 904. In alternate embodiments, a retaining device 904 can first be coupled with an item 902 and then adjusted to achieve the desired geometric position relative to a base 912 and/or surface 914. FIGS. 9 and 12 depicts examples of possible geometric configurations of an item holder 900, however in alternate embodiments, an item holder 900 can be adjusted to have any other known and/or convenient configuration, depending on desired use, the item 902 being used, and relative position of a user.

Figure 13A:
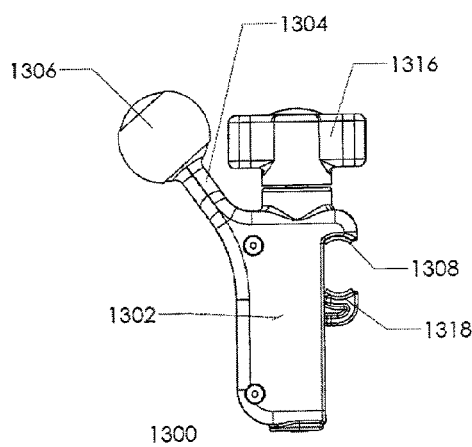
FIG. 13*a* depicts a side view of an embodiment of a base member of the present device.

FIG. 13a depicts a side view of an embodiment of a base unit 1300 for another embodiment of the present device. A base unit 1300 can have a housing 1302. In some embodiments, as shown in FIG. 13a, a housing 1302 can have a substantially rectangular geometry, but in other embodiments can have any other known and/or convenient geometry. A housing 1302 can be comprised of a single piece or multiple pieces. In the embodiment shown in FIGS. 13a-13d, a housing can comprise a pair of selectively mated pieces that can be substantially symmetric about a longitudinal plane. In such embodiments the mated pieces can be joined with pins, screws, bolts, or any other known and/or convenient fasteners, or can be joined with adhesives, friction-fit, welding, or any other known and/or convenient method.

As shown in FIG. 13a, an elongated member 1304 can extend from at least one exterior point on a housing 1302 and can terminate in a clamp ball 1306. In some embodiments, as shown in FIG. 13a, an elongated member 1304 can extend substantially from an exterior corner edge of a housing, but in other embodiments can extend from any other known and/or convenient location on a housing 1302. In some embodiments an elongated member 1304 can extend at an angle of approximately 45-degrees relative to an exterior surface of a housing 1302, but in other embodiments can be oriented at any other known and/or convenient angle.

As shown in FIG. 13a, a first jaw member 1308 can protrude from another edge of a housing 1302. In some embodiments, as shown in FIG. 13a, a first jaw member 1308 can be oriented on an edge of a housing 1302 opposite that of and substantially in the same longitudinal plane as an elongated member 1304. However, in other embodiments, a first jaw member 1308 can be located in any other known and/or position on the exterior of a housing 1302.

Figure 13B:
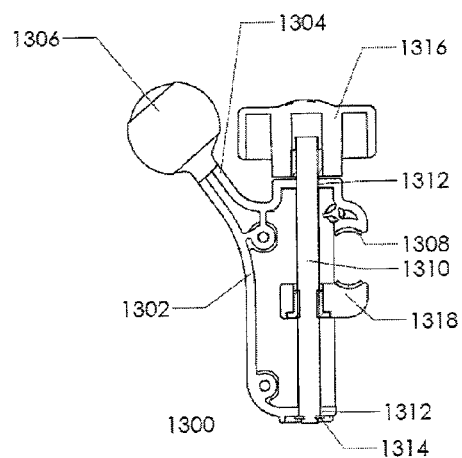
FIG. 13*b* depicts a side cutaway view of the embodiment shown in FIG. 13*a*.
Figure 13C:
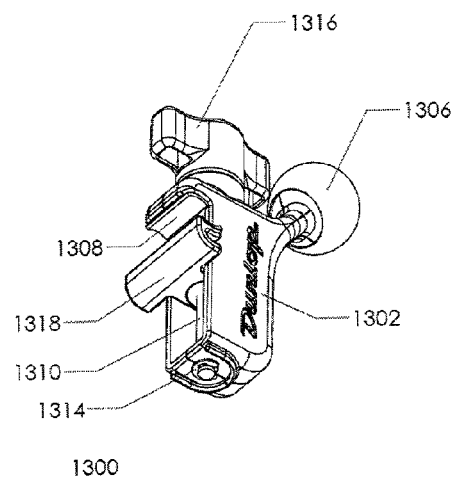
FIG. 13*c* depicts a perspective bottom view of the embodiment shown in FIG. 13*a*.
Figure 13D:
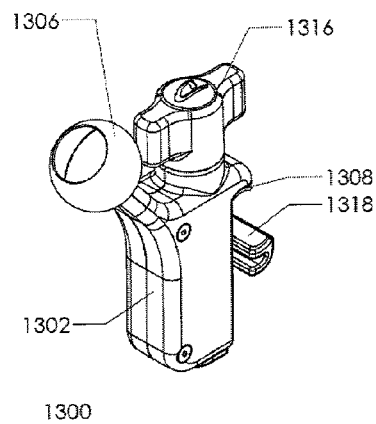
FIG. 13*d* depicts a perspective top view of the embodiment shown in FIG. 13*a*.

FIG. 13b depicts a side cutaway view of the embodiment show in FIG. 13a. An elongated threaded member 1310 can extend longitudinally through a housing 1302 via openings 1312 located at opposite ends of a housing 1302. A retaining clip 1314 can be attached to one end of a threaded member 1310 on the exterior of housing 1302. A handle 1316 can be affixed to the opposite end of a threaded member 1310. A handle 1316 can be t-shaped, ball, or any other known and/or convenient geometry. A second jaw member 1318 can be threaded onto threaded member 1310, such that as a handle 1316 is turned, a second jaw member 1318 can linearly move relative to a first jaw member 1308.

As shown in FIGS. 13a-13d, a first jaw member 1308 and a second jaw member 1318 can have slightly curved interior surfaces, but in other embodiments can have any other known and/or convenient geometry. In some embodiments, a first jaw member 1308 and a second jaw member 1318 can be configured to selectively engage with the rim of a drum, but in other embodiments can be configured to selectively engage with any other known and/or convenient instruments or equipment, such as, but not limited to brass instruments and sound systems. In some embodiments the interior surfaces of jaw members 1308 and 1318 can further comprise a material to provide additional grip or padding.

In some embodiments, a base unit 1300 can be fabricated from metal, plastic, polymer, or any other known and/or convenient material or combination of materials. In some embodiments, these elements can be uniform in color or can be comprised of different colors and/or patterns. In yet other embodiments, a base unit can have intrinsic anti-bacterial properties or can have protective anti-bacterial and/or ultraviolet-resistant coating. In alternate embodiments, the elements of a base unit can have any other known and/or convenient surface or material properties.

In use, a base unit 1300 can be coupled with an item holder via a clamp as described above and depicted in FIG. 10. A clamp ball 1306 can be engaged with one end of a clamp assembly 908, while the other end of a clamp assembly 908 can be engaged with the clamp ball of a retaining device 904, sheet music holder 200, or any other known and/or convenient device. A user can orient jaws 1308 and 1318 about a desired location on an instrument or piece of equipment, such as a drum rim. A user can then turn a handle 1316 to adjust a second jaw member 1318 relative to a first jaw member 1308 to obtain a secure fit onto the rim, for example. A user can then adjust the position of a retaining device 904 or sheet music holder 200 relative to a drum rim to optimize visibility or other desired features. To remove a base unit 1300 from a rim, a user can then turn a handle 1316 to release jaws 1308 1318 from contact with the rim.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A holder comprising:
a base comprising a housing, a first jaw member fixed to said housing, a threaded member extending through said housing, a handle coupled with an end of said threaded member outside of said housing, and a second jaw member having an internal portion threaded onto said threaded member inside of said housing and an external portion extending outside of said housing;
a first clamp ball coupled with said base;
a retaining device coupled with a second clamp ball; and
a clamp assembly coupled with each of said first and second clamp balls,
wherein said retaining device is adapted to engage an item,
said clamp assembly selectively engages each of said first and second clamp balls and allows relative adjustment of said base and said retaining device, and
said second jaw member is configured to move linearly along the longitudinal length of said threaded member relative to said first jaw member upon axial rotation of said handle.

2. The holder of claim 1, wherein said item is selected from the group consisting of: tablet computer, portable media player, mobile phone, sheet music, camera, and microphone.

3. The holder of claim 1, wherein said first jaw member and said second jaw member are configured to selectively engage with a drum rim.

4. The holder of claim 1, wherein said second clamp ball is connected to of one end of an elongated member, and said retaining device further comprises a plurality of engagement regions capable of selectively engaging with the end of said elongated member opposite said second clamp ball.

5. The holder of claim 1, wherein said first clamp ball is coupled with said base via an intermediate elongated member.

6. The holder of claim 5, wherein said intermediate elongated member extends at a substantially 45 degree angle from an exterior corner of said base.

7. The holder of claim 5, wherein the external portion of said second jaw member is located on a side of said base opposite to said intermediate elongated member.

8. The holder of claim 1, wherein said retaining device further comprises a plurality of prongs configured to engage said item.

9. A kit of components for a holder, comprising:
an interchangeable base comprising a housing, a first jaw member fixed to said housing, a threaded member extending through said housing, a handle coupled with an end of said threaded member outside of said housing, and a second jaw member having an internal portion threaded onto said threaded member inside of said housing and an external portion extending outside of said housing;
a first clamp ball coupled with said interchangeable base;
an interchangeable retaining device coupled with a second clamp ball; and
a clamp assembly coupled with each of said first and second clamp balls,
wherein said retaining device is adapted to engage an item,
said clamp assembly selectively engages each of said first and second clamp balls and allows relative adjustment of said base and said retaining device, and
said second jaw member is configured to move linearly along the longitudinal length of said threaded member relative to said first jaw member upon axial rotation of said handle.

* * * * *